United States Patent

Ono

[19]

[11] Patent Number: 5,999,560
[45] Date of Patent: Dec. 7, 1999

[54] RAKE RECEPTION METHOD FOR A SPREAD SPECTRUM SIGNAL

[75] Inventor: Shigeru Ono, Tokyo, Japan

[73] Assignee: NEC Corporation, Japan

[21] Appl. No.: 09/151,059

[22] Filed: Sep. 10, 1998

[30] Foreign Application Priority Data

Sep. 11, 1997 [JP] Japan ................................. 9-246742

[51] Int. Cl.$^6$ ................................................. H04B 1/69
[52] U.S. Cl. ........................... 375/200; 375/347; 455/137
[58] Field of Search .................................. 375/200, 347; 455/132, 137

[56] References Cited

U.S. PATENT DOCUMENTS

| | | | |
|---|---|---|---|
| 5,602,834 | 2/1997 | Dean et al. | 370/335 |
| 5,621,752 | 4/1997 | Antonio et al. | 375/200 |
| 5,737,327 | 4/1998 | Ling et al. | 370/335 |
| 5,754,583 | 5/1998 | Eberhardt et al. | 375/200 |

FOREIGN PATENT DOCUMENTS 8-237171  9/1996  Japan .

OTHER PUBLICATIONS

Viterbi, A., CDMA/Principles of Spread Spectrum Communication, Addison–Wesley Publishing Company, p. 89, 1995.

Higashi, et al., "Path/Space Joint Diversity Performance of Coherent Detection RAKE with Interpolation on DS–CDMA", Proceedings of IEICE General Conference, B–410, 1995.

Karasawa, et al., "A Space–Path Hybrid Diversity Scheme for Base–Station Reception in CDMA Mobile Radio Communication Systems", Technical Report of IEICE, SAT93-12, pp. 41–47, 1993.

Andoh, et al., "Performance of RAKE and Space Diversity Using Multi–pilot–block Channel Estimation for DS–CDMA", Proceedings of IEICE General Conference, B–5–13, 1997.

Higashi, et al., Performance of Coherent RAKE detection using Interpolation on DS/CDMA, Technical Report of IEICE, RS 94–98, pp. 57–62, 1994.

*Primary Examiner*—Stephen Chin
*Assistant Examiner*—Lenny Jiang
*Attorney, Agent, or Firm*—Ostrolenk, Faber, Gerb & Soffen, LLP

[57] ABSTRACT

The connection between a plurality of antenna output signals and a plurality of finger units is switched in dependence upon a reception state of each multipath propagation path at each antenna branch to controllably select those finger units to be subjected to RAKE combination. A particular finger unit is excluded from RAKE combination if the reception state does not satisfy a predetermined condition.

2 Claims, 3 Drawing Sheets

RAKE RECEPTION METHOD FOR A SPREAD SPECTRUM SIGNAL

BACKGROUND OF THE INVENTION

This invention relates to a RAKE reception method of receiving a spread spectrum signal in mobile communication.

In recent years, it is attempted to apply a spread spectrum communication system to mobile communication. This is because the spread spectrum communication system is highly tolerant to interference or jamming so as to achieve an excellent reception characteristic even in a multipath environment in which a transmitted signal is reflected and refracted by a variety of terrains or buildings to be received via different propagation paths (hereinafter called multipath propagation paths). Since the spread spectrum communication system uses a high spread frequency, it is possible to distinguish the multipath propagation paths from one another. This allows an application of a RAKE reception system. The RAKE reception system is a technique which provides a path diversity effect. Specifically, the RAKE reception system comprises the steps of separating the multipath propagation paths from one another, estimating propagation path characteristics of the individual paths, compensating reception signals of the individual paths with the propagation path characteristics to produce compensated reception signals, and coherently combining the compensated reception signals. In the RAKE reception system, a portion called a "finger" carries out the estimation of the propagation path characteristic of each individual path and the compensation therefor. For this purpose, the finger comprises a weighting factor estimating portion and a weighting circuit. The finger also includes a correlator for despreading a spread spectrum code (see Reference 1: Andrew J. Viterbi, CDMA/Principles of Spread Spectrum Communication, Addison-Wesley Publishing Company, page 89, 1995).

In case where propagation path delays in the individual multipath propagation paths can be separated from one another by the spread frequency, the RAKE reception system having the path diversity effect is extremely effective. However, if the difference in propagation distance among the multipath propagation paths is small such as in an urban area, path separation may be impossible in dependence upon the spread frequency. In this event, flat fading appears in the reception signals of the individual paths. In order to avoid the deterioration in reception characteristic due to the flat fading, it is effective to utilize a space diversity effect obtained by a plurality of antennas arranged apart from one another. Taking the above into consideration, it is proposed to combine the path diversity effect of the RAKE reception system and the space diversity effect by the plurality of antennas.

For example, Reference 2 (JP-A 8-237171) discloses a method of arranging a plurality of antennas as antenna branches, measuring RAKE reception levels of the individual antenna branches, and selecting a particular one of the antenna branches which has a highest reception level. Instead of switching among the antenna branches, Reference 3 (Higashi et al, "Path/Space Joint Diversity Performance of Coherent Detection RAKE with Interpolation on DS-CDMA", Proceedings of IEICE General Conference, B-410, 1995) and Reference 4 (Karasawa et al, "A Space-Path Hybrid Diversity Scheme for Base-Station Reception in CDMA Mobile Radio Communication Systems", Technical Report of IEICE, SAT93-12, pages 41–47, 1993) propose a system in which all multipath components received by the individual antenna branches are coherently combined so as to achieve a hybrid effect of the path diversity and the space diversity. In Reference 5 (Andoh et al, "Performance of RAKE and Space Diversity using Multi-pilot-block Channel Estimation for DS-CDMA", Proceedings of IEICE General Conference, B-5-13, 1997), the hybrid effect of the space diversity and the path diversity is confirmed by simulation tests.

Comparing the above-mentioned prior art techniques, the technique of coherently combining all multipath components received by the individual antenna branches (References 3, 4, and 5) is superior in reception characteristic over the technique of switching among the antenna branches (Reference 2).

In the above-mentioned prior art techniques, each antenna branch is fixedly connected to a set of the fingers. This structure is disadvantageous in the following respects. In the urban area with many tall buildings, there are an increased number of multipath propagation paths. In case of mobile communication, new propagation paths appear and old ones disappear very frequently so that the number of the propagation paths varies from time to time. Under the influence of shadowing, the reception characteristic of each individual antenna branch varies in a short time. In order to achieve an optimum reception structure, it is not desirable to permanently fix the connection between the antenna branch and the set of the fingers.

FIGS. 1 and 2 show the RAKE reception systems described in References 2 and 3, respectively. In either system, a preselected number of fingers are fixedly connected to each individual antenna branch. Each of the fingers has a correlator, weighting circuit, and a weighting factor estimating portion. In FIG. 1, RAKE combination is performed in a RAKE combiner for each individual antenna branch to produce a combined reception level. As a result of comparison, a particular antenna branch having a high reception level is selected in a switch SW. In FIG. 2, RAKE combination is performed in a single RAKE combiner to collectively combine all finger outputs of the both antenna branches. As far as a set of the fingers are fixedly assigned to each individual antenna branch, a total number of the fingers required in either system is equal to an integral multiple of the number of the branches. This results in an increase in size of the receiver.

In the prior art techniques, the branches or the paths selected for coherent combination are instantaneously switched upon reception of a small number of symbols. Thus, instantaneous variation of a reception signal received by each individual branch or path is excessively followed. Since the number of multipath propagation paths is great in the urban area as described above, the ratio of signal power to noise power (Eb/No) or the ratio of signal power to interference power (Eb/Io) for each path is small. Thus, other components than a desired signal component occupy a considerable part. Even if path selection is carried out in correspondence to a particular reception signal instantaneously exhibiting high correlation, it is not assured that a resultant reception characteristic is improved in average. In particular, the RAKE combination is effective provided that (1) propagation characteristics of the individual paths are statistically independent from one another and (2) each finger processes a proper reception signal.

In the spread spectrum communication system, when the Eb/No ratio or the Eb/Io ratio for each path is decreased at a particular station under the influence of the interference from other stations or the multipath propagation paths of the particular station itself, pseudo peak correlation appears. If the paths selected for RAKE combination are determined with reference to the pseudo correlation peaks, the resultant reception characteristic is undesiredely deteriorated. Therefore, the fingers selected for RAKE combination must be determined in dependence upon the characteristics of the reception signals. In particular, the paths selected for RAKE combination must be determined so that the average reception characteristic is improved. Since the multipath variation or the variation of the reception signal in each individual antenna branch is in situ probabilistic, high correlation instantaneously obtained does not assure that a path or a branch which is proper in average is caught. In order to avoid any improper path from being caught due to instantaneous variation, it is necessary to incorporate a mechanism for protecting synchronization.

SUMMARY OF THE INVENTION

It is an object of this invention to provide a RAKE reception method for a spread spectrum signal, which is capable of efficiently achieving a hybrid effect of a space diversity effect and a path diversity effect by the use of a receiver in a small scale.

Other objects of this invention will become clear as the description proceeds.

According to this invention, there is provided a RAKE reception method for a spread spectrum signal, in which a plurality of antenna signals from a plurality of diversity reception antennas are demodulated by a plurality of finger units assigned to a plurality of multipath propagation paths, wherein the connection between the antenna signals and the finger units is switched in dependence upon reception states of the multipath propagation paths at antenna branches to controllably select those finger units subjected to RAKE combination.

The reception state of each individual multipath propagation path can be judged with reference to an average delay profile calculated for each individual antenna branch.

If the reception state of a particular multipath propagation path does not satisfy a predetermined condition, a particular finger unit assigned to such multipath propagation path is excluded from RAKE combination.

DESCRIPTION OF PREFERRED EMBODIMENT

Figure 1:
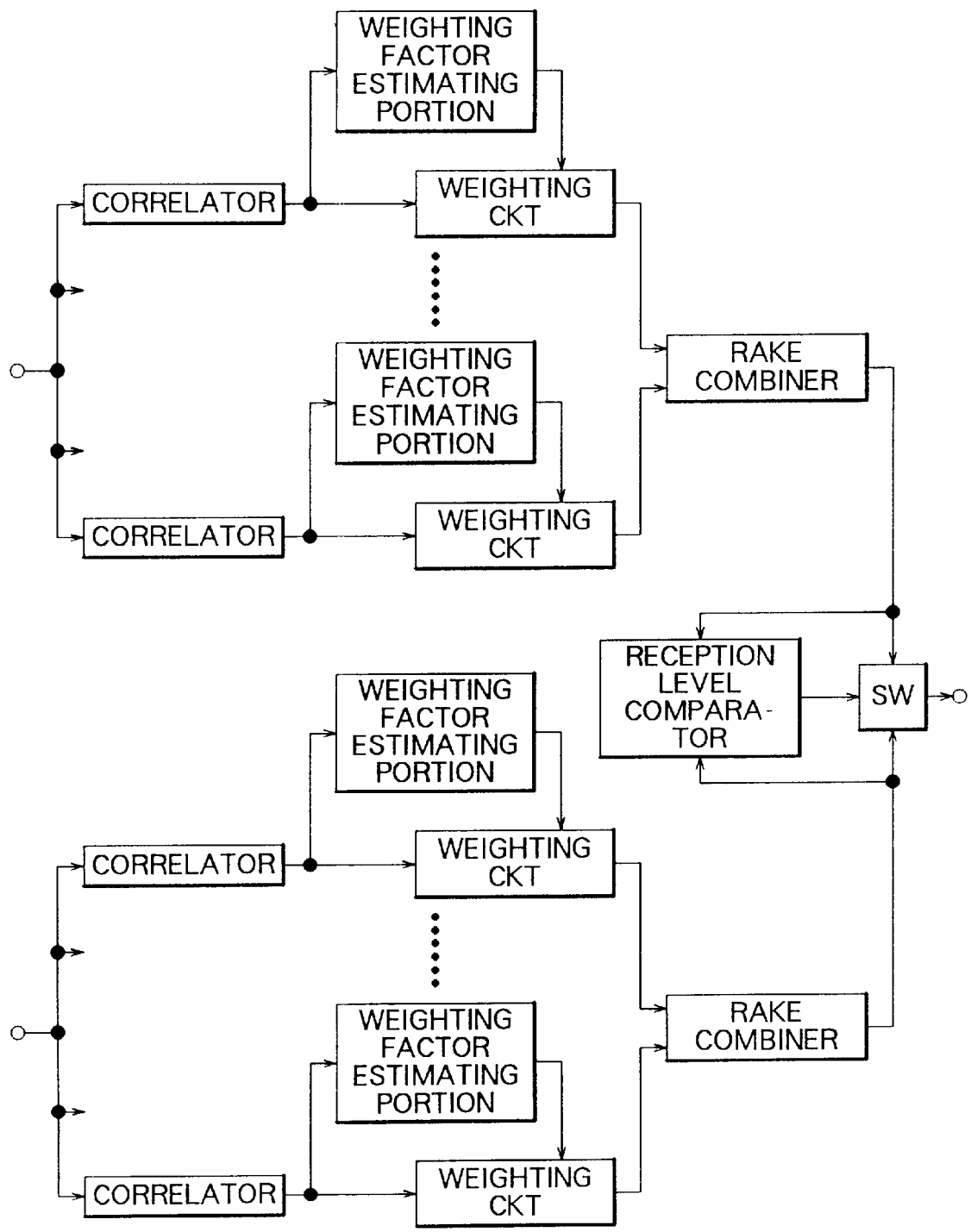
FIG. 1 is a view showing a conventional RAKE reception system.
Figure 2:
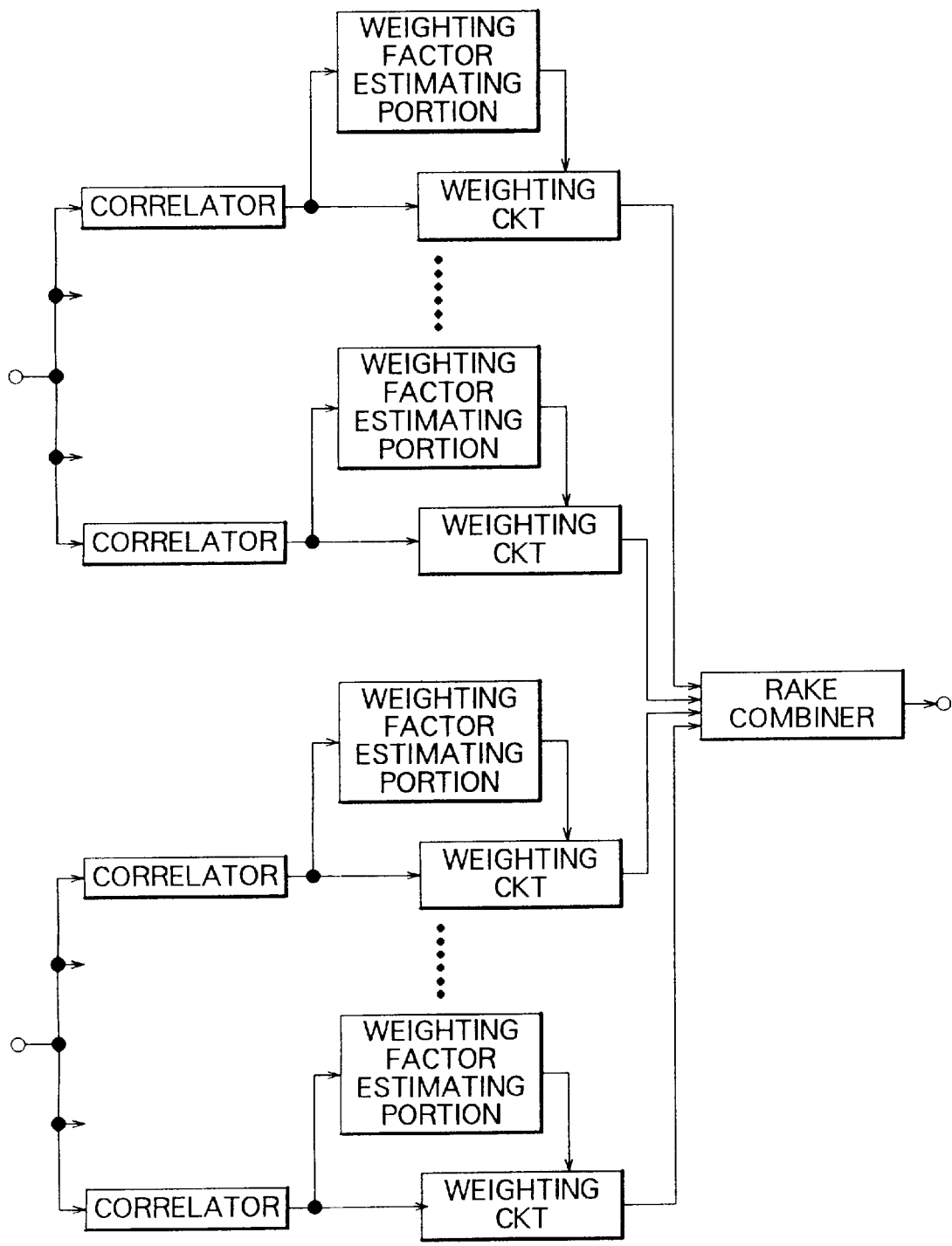
FIG. 2 is a view showing another conventional RAKE reception system.

Now, description will be made about this invention with reference to the drawing. The following description assumes a spread spectrum system in which a pilot symbol known to both transmission and reception sides is periodically transmitted.

Figure 3:
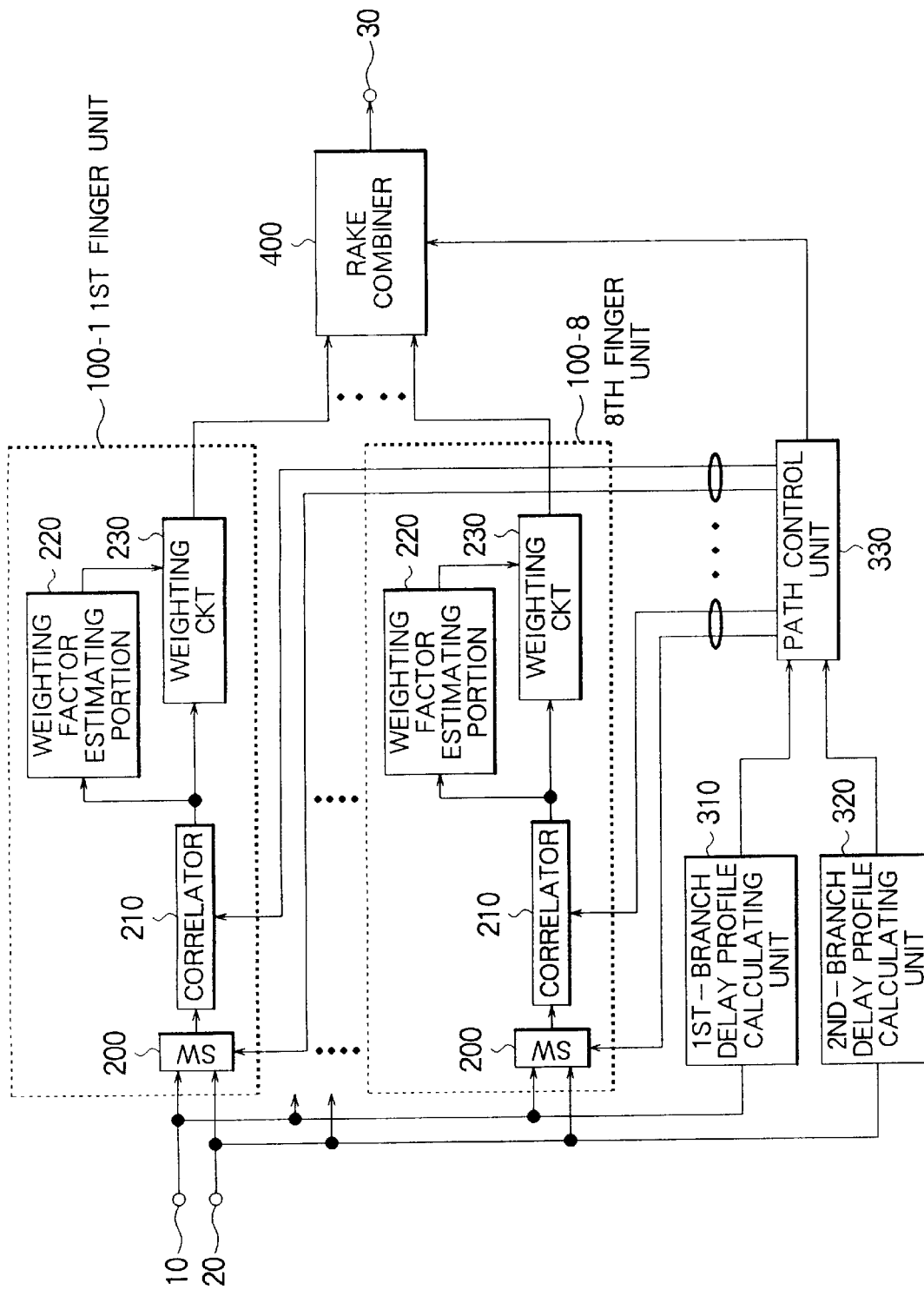
FIG. 3 is a block diagram of a RAKE reception system to which a RAKE reception method of this invention is applied.

Referring to FIG. 3, a RAKE receiver according to an embodiment of this invention includes first and second antenna branches (or first-branch and second-branch input terminals) 10 and 20 connected to first and second diversity reception antennas in which a spread spectrum singal is received as first and second antenna output signals. The RAKE receiver further includes first through eighth finger units 100-1 through 100-8 which serve as demodulators for RAKE reception, first-branch and second-branch delay profile calculating units 310 and 320, a path control unit 330, and a RAKE combiner 400 connected to a demodulator output terminal 30. Each of the first through the eighth finger units 100-1 through 100-8 comprises a switch 200, a correlator 210, a weighting factor (or coefficient) estimating portion 220, and a weighting circuit 230. For simplicity of illustration, the first and the eighth finger units 100-1 and 100-8 alone are illustrated.

Referring to FIG. 3, the first-branch and the second-branch input terminals 10 and 20 are supplied with first-branch and second-branch reception signals received by the first and the second antenna branches, respectively. The first-branch reception signal is supplied from the first-branch input terminal 10 to the switches 200 in the first through the eighth finger units 100-1 through 100-8 and to the first-branch delay profile calculating unit 310. Likewise, the second-branch reception signal is supplied from the second-branch input terminal 20 to the switches 200 in the first through the eighth finger units 100-1 through 100-8 and to the second-branch delay profile calculating unit 320. Supplied with the first-branch and the second-branch reception signals, the first-branch and the second-branch delay profile calculating units 310 and 320 calculate first-branch and second-branch delay profiles, respectively, by the use of a replica transmission signal. Each of the first-branch and the second-branch delay profiles is represented by a correlation power level of the replica transmission signal and each of the first-branch and the second-branch reception signals. An integration time and a time interval for delay profile calculation (i.e., calculation start and end time instants) are preliminarily determined or indicated by an external request reflecting the reception characteristic. The integration time serves to accommodate the instantaneous variation of the path. The first-branch and the second-branch delay profiles calculated in the first-branch and the second-branch delay profile calculating units 310 and 320 are delivered to the path control unit 330 at a unit time interval corresponding to the integration time.

Supplied with the first-branch and the second-branch delay profiles, the path control unit 330 selects one of the antenna branches to be connected to each of the finger units 100-1 through 100-8 and determines the timing of a despreading operation carried out by the correlator 210 of each of the finger units 100-1 through 100-8. The operation of the path control unit 330 will hereafter be described.

1) At first, the first-branch and the second-branch delay profiles are examined to detect first through M-th (M being a total number of the finger units, which is equal to eight in the illustrated example) positions giving peak correlation power levels. These positions will hereafter be called peak output phases. Herein, the first through the M-th peak output phases must be separated from one another, for example, by 0.75 chip or more. An average noise power level is estimated by averaging correlation power levels in the vicinity of the first through the M-th peak output phases, for example, at positions separated by one symbol or more.

2) Next, the antenna and the despread timing assigned to each finger unit are compared with the peak output phases detected in the step 1). In order to determine whether or not the antenna and the despread timing currently assigned to each finger unit is to be changed, judgement is made about whether or not each finger unit catches an effective multipath propagation path.

Specifically, a particular one of the finger units is judged to be synchronous (i.e., catching the effective multipath propagation path) when the despread timing at the antenna already assigned thereto has a phase difference not greater than ±0.75 chip from the peak output phase detected as described above. In this event, the parameters already assigned to the finger unit are not renewed or changed. On the other hand, if no such peak output phase is found, the particular finger unit is judged to be asynchronous (i.e., catching no effective multipath propagation path). Herein, the despread timing is converted into a position on the delay profile, like the peak output phase.

3) If some of the peak output phases detected have phase differences not smaller than ±1 chip from the despread timing of the antenna already assigned to each finger unit, those peak output phases are judged to be candidate effective peak output phases. A particular one of the candidate effective peak output phases which appears consecutively twice within ±0.75 chip is selected as an effective peak output phase.

4) For example, it is assumed that a particular finger unit is consecutively twice judged to be in an asynchronous state. If there is the effective peak output phase, it is assigned as a new antenna and despread timing. If there is no effective peak output phase, the RAKE combiner 400 is requested not to RAKE combine an output signal from the particular finger unit in an asynchronous state. On the other hand, if the particular finger unit is judged to be in an asynchronous state less frequently than consecutively twice, the parameters assigned to the particular finger unit are unchanged.

5) The information of the antenna and the despread timing to be assigned to each finger unit is delivered to the finger unit.

The information of the peak output phase detected by the above-mentioned path control unit 330 is delivered to the correlators 210 of the finger units 100-1 through 100-8. The antenna branch information is delivered to the switches 200 of the finger units 100-1 through 100-8. The information of those finger units selected for RAKE combination is delivered to the RAKE combiner 400.

The operation of each of the finger units 100-1 through 100-8 is as follows. Controlled by the path control unit 330, the switch 200 selects one of the first-branch and the second-branch reception signals as a selected reception signal and supplies the selected reception signal to the correlator 210. The correlator 210 despreads the selected reception signal from a phase point designated by the path control unit 330 to produce a despread reception signal. The despread reception signal is supplied to the weighting factor estimating portion 220 and the weighting circuit 230. With reference to an average of the despread reception signal supplied from the correlator 210, the weighting factor estimating portion 220 carries out channel estimation for a corresponding section to determine an estimated weighting factor. A conjugated complex number of the estimated weighting factor is supplied to the weighting circuit 230 and multiplied on the despread reception signal to produce a weighted reception signal. The weighted reception signal is delivered to the RAKE combiner 400. The channel estimation may be carried out by the use of a pilot symbol or a preamble symbol. The channel estimation using the pilot symbol is described in detail in page 89 of the Reference 1, the Reference 5, and the Reference 6 (Higashi et al "Performance of Coherent RAKE detection using Interpolation on DS/CDMA", Technical Report of IEICE, RCS 94–98, pages 57–62, 1994). The RAKE combiner 400 carries out coherent combination of the weighted reception signals supplied from the finger units, except those designated by the path control unit 330 to be excluded from RAKE combination, to produce a combined reception signal. The combined reception signal is delivered through the output terminal 30.

As described above, the finger units to be connected to each antenna are controllably selected with reference to the reception characteristics of the respective antenna branches. It is therefore possible according to this invention to achieve both the space diversity effect and the path diversity effect with a scale smaller than that required in the prior art. In addition, assignment of the finger units to the multipath propagation paths is switched by the use of the average delay profiles in the respective antenna branches. Therefore, the assignment of the finger units can be carried out without being affected by fading or noise variation. Furthermore, if a particular finger unit has the reception level lower than a predetermined level or equivalent to the interference level, the particular finger unit is excluded from RAKE combination. It is thus possible to suppress the deterioration in characteristic due to the RAKE combination.

What is claimed is:

1. A RAKE reception method which is for a spread spectrum signal and which includes the steps of receiving said spread spectrum signal as first and second antenna signals in first and second diversity reception antennas and demodulating each of said first and second antenna signals in each of a plurality of finger units assigned to a plurality of multipath propagation paths, wherein said method comprises the step of switching the supply of each of said first and said second antenna signals to each of said finger units in dependence upon reception states of said first and said second antenna signals at each of said multipath propagation paths to controllably select the finger units subjected to RAKE combination and further wherein the reception states of said first and said second antenna signals at each of said multipath propagation paths are judged with reference to an average delay profile calculated for each of said first and said second antenna signals.

2. A RAKE reception method as claimed in claim 1, further comprising the step of excluding, if the reception state of a particular multipath propagation path of said multipath propagation paths does not satisfy a predetermined condition, a particular finger unit of said finger units assigned to said particular multipath propagation path from said RAKE combination.

* * * * *